UNITED STATES PATENT OFFICE.

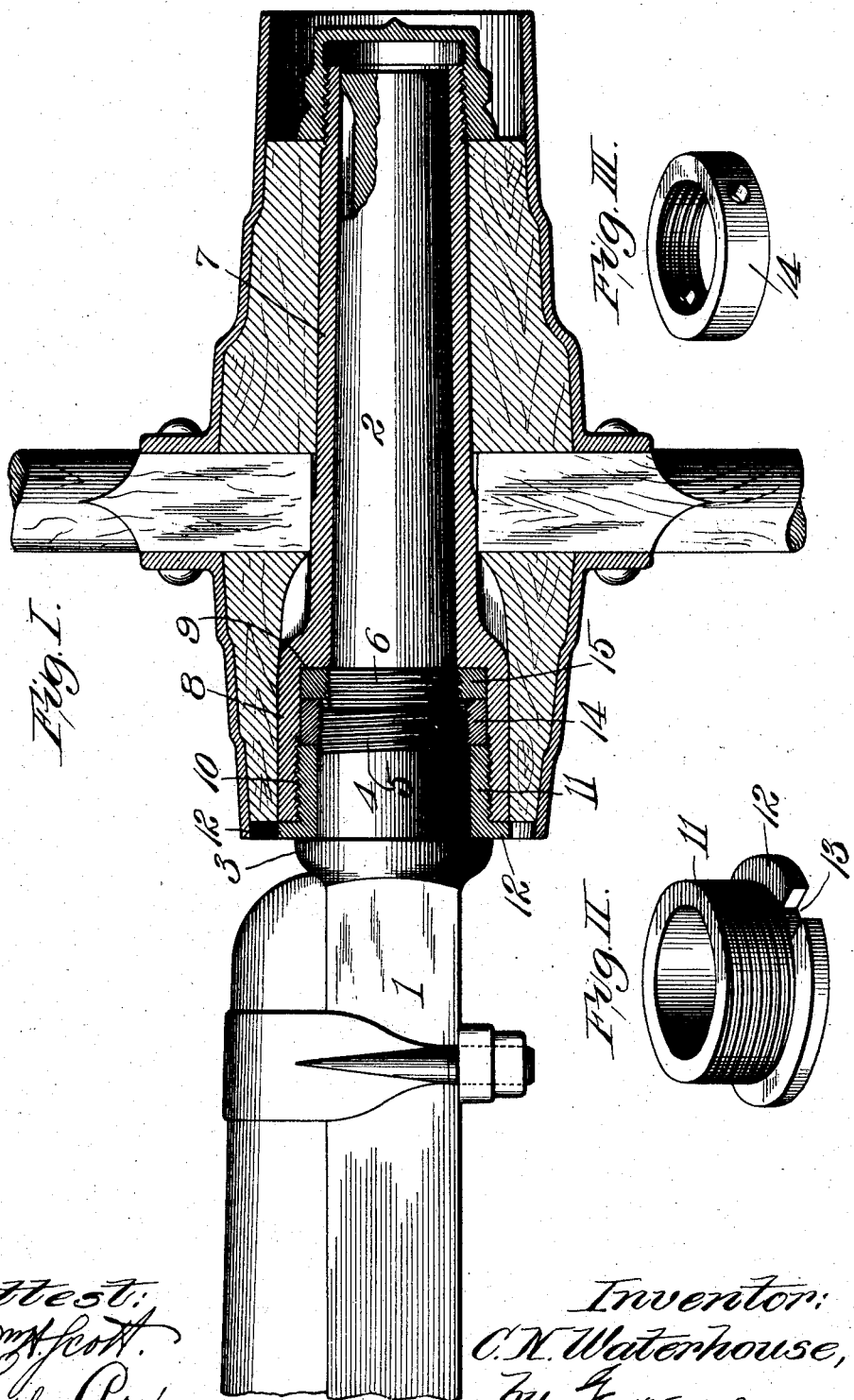

CHARLES N. WATERHOUSE, OF ST. LOUIS, MISSOURI.

COMBINED SPINDLE AND VEHICLE-WHEEL AXLE-BOX.

No. 865,139.　　　　Specification of Letters Patent.　　　　Patented Sept. 3, 1907.

Application filed January 24, 1907. Serial No. 353,830.

*To all whom it may concern:*

Be it known that I, CHARLES N. WATERHOUSE, a citizen of the United States of America, residing in the city of St. Louis and State of Missouri, have invented certain new and useful Improvements in a Combined Spindle and Vehicle - Wheel Axle-Box, of which the following is a full, clear, and exact description, reference being had to the accompanying drawing, forming part of this specification.

My invention relates to a spindle and vehicle wheel axle box so constructed and having such relation to each other that the axle box may be adjusted to a fine degree upon the spindle with the result of avoiding unnecessary end thrust of the box and also so constructed that any play which may result from wear of the parts may be compensated for by adjustment of a take-up device.

Figure I is a view partly in elevation and partly in longitudinal section illustrating my improvement. Fig. II is a perspective view of the axle nut. Fig. III is a perspective view of the inner take-up nut.

1 designates a vehicle axle and 2 one of its spindles. At the rear end of the spindle 2 is an annular shoulder or rim 3. The spindle is provided at a point immediately in front of said shoulder with a rear plain circular portion 4 adjacent to which is an inner screw thread 5 and adjacent to the inner screw thread 5 is a reduced portion having an outer screw thread 6, one of these threads being a right hand one and the other a left hand one.

7 designates an axle box which conforms approximately to the shape of the spindle 2 and is snugly fitted thereto throughout its forward portion. This axle box terminates at its rear end in an enlargement 8 at the base of which and within the box is a shoulder 9. The enlargement of the axle box is provided with an internal screw thread 10 and an internal inner plain circular portion.

11 designates an axle nut having a plain inner surface that is loosely fitted to the circular portion 4 of the plain spindle 2 and is provided with an external screw thread that engages the internal screw thread of the axle box when the nut is inserted into the enlargement of the axle box. The axle nut is provided at its rear end with an annular vertical rim 12 that is adapted to bear against the rear end of the axle box and contains one or more notches 13 for the purpose of permitting application of a spanner wrench to the axle nut in order that it may be turned in introducing it into the axle box or removing it therefrom. The rear end of the axle nut is adapted to bear against the shoulder 3 of the axle spindle while the forward end of the axle nut extends to the inner screw thread 5 of the spindle. 14 is an inner take-up nut that is fitted to the inner screw thread 5 and to the inner plain portion of the axle box and bears against the forward end of the axle nut and 15 is an outer jam nut fitted to the outer screw thread 6 of the axle spindle and to the inner plain portion of the axle box and bears against the take-up nut to hold it from movement after it has been adjusted to the desired degree to cause it to occupy a position in contact with the forward end of the axle nut. The take-up nut and jam nut are freed of connection with the axle box and therefore said box is free to turn on the axle spindle without affecting the nuts while at the same time the jam nut affords a bearing for the rear end of the axle box, due to its shoulder 9 being disposed in opposition to said jam nut.

In assembling my axle box and parts associated therewith on the axle spindle, the axle nut 11 is first applied to the spindle and seated on the plain circular portion 4 thereof so that its rear end will rest against the shoulder 3 of the spindle. The take-up nut 14 is then applied to the spindle and turned on the inner screw thread 5 until it is brought into contact with the forward end of the axle nut and acts to confine said axle nut snugly between its rear end and the shoulder 3 of the spindle. The jam nut 15 is then applied to the spindle and turned on the outer screw thread 6 until it is tightly fitted to the take-up nut from rotation. The vehicle wheel with the axle box therein is then aplied to the spindle by slipping the axle box thereonto until its rear end is brought into juxtaposition with the axle nut 11. Then by either holding the axle nut while the wheel with the axle box is rotated on the spindle, or by causing the wheel to remain stationary while the axle nut is turned, the axle nut is caused to enter into the rear end of the box in engagement with the thread upon the interior thereof until the box is fully drawn onto the spindle to be held by the axle nut.

I claim:

The combination of a spindle formed with an annular shoulder at its rear end, with a rear plain circular portion in advance of the annular shoulder, with an inner screw thread turned in one direction in advance of the rear plain circular portion and with a reduced portion having an outer screw thread turned in the opposite direction to the inner screw thread, an axle-nut formed with an annular vertical rim bearing against the annular shoulder of the spindle and with an external screw thread and mounted on the rear plain circular portion of the spindle, the inner take-up nut mounted on the inner screw thread of the spindle, and bearing against the axle-nut, the outer jam nut of the same diameter as the inner take-up nut and mounted on the outer screw thread of the reduced portion of the spindle and bearing against the inner take-up nut, and the axle box mounted on the spindle and having an enlargement formed with an internal plain circular portion mounted on the inner take-up and outer jam nuts, and with an internal screw thread, engaging the external screw thread of the axle nut and bearing against the vertical rim of the latter.

C. N. WATERHOUSE.

In presence of—
BLANCHE HOGAN,
LILY ROST.